United States Patent
Dolgin et al.

(10) Patent No.: US 10,225,020 B2
(45) Date of Patent: Mar. 5, 2019

(54) SYSTEMS AND METHODS FOR DEMODULATION OF PSK MODULATED OPTICAL SIGNALS

(71) Applicant: RAYTHEON COMPANY, Waltham, MA (US)

(72) Inventors: Benjamin P. Dolgin, Alexandria, VA (US); Gary M. Graceffo, Burke, VA (US); Andrew Kowalevicz, Arlington, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/725,457

(22) Filed: Oct. 5, 2017

(65) Prior Publication Data

US 2018/0102853 A1 Apr. 12, 2018

Related U.S. Application Data

(60) Provisional application No. 62/405,445, filed on Oct. 7, 2016.

(51) Int. Cl.
*H04B 10/06* (2006.01)
*H04B 10/61* (2013.01)
(Continued)

(52) U.S. Cl.
CPC .............. *H04B 10/612* (2013.01); *G02B 5/28* (2013.01); *G02F 2/00* (2013.01)

(58) Field of Classification Search
CPC .............. H04B 10/697; H04B 10/6973; H04B 10/672; H04B 10/6163; H04B 10/691;
(Continued)

(56) References Cited

U.S. PATENT DOCUMENTS 3,936,603 A 2/1976 Guppy et al.
5,371,623 A 12/1994 Eastmond et al.
(Continued)

FOREIGN PATENT DOCUMENTS

| JP | H0591047 A | 4/1993 |
| WO | 0195534 A2 | 12/2001 |
| WO | 2016170466 A1 | 10/2016 |

OTHER PUBLICATIONS

Arimoto et al., "High-speed free-space laser communication", Performance and Management of Complex Communications Networks, 1998, pp. 175-190.
(Continued)

*Primary Examiner* — Hanh Phan
(74) *Attorney, Agent, or Firm* — Lando & Anastasi, LLP

(57) ABSTRACT

Optical signal receivers and methods are provided that include first and second optical resonators, each of which receives a portion of an arriving optical signal. The first optical resonator is tuned to a carrier wavelength and accumulates resonant optical signal energy whose output is disturbed responsive to a transition in the arriving optical signal. The second optical resonator is detuned from the carrier wavelength but also exhibits a disturbed output responsive to the transition in the arriving optical signal. Detectors detect the output disturbances from the two optical resonators to determine characteristics of the transition in the arriving optical signal.

20 Claims, 8 Drawing Sheets

(51) Int. Cl.
*G02F 2/00* (2006.01)
*G02B 5/28* (2006.01)

(58) Field of Classification Search
CPC .. H04B 10/671; H04B 10/6165; H04B 10/67; H04B 10/612
USPC ....... 398/202, 212, 213, 214, 204, 205, 206, 398/207, 208, 209, 210, 135, 136, 158, 398/159, 183, 188
See application file for complete search history.

(56) References Cited

U.S. PATENT DOCUMENTS

| | | | |
|---|---|---|---|
| 5,581,575 | A | 12/1996 | Zehavi et al. |
| 5,684,793 | A | 11/1997 | Kiema et al. |
| 6,456,422 | B1 | 9/2002 | Hayes et al. |
| 7,259,901 | B2 | 8/2007 | Parsons et al. |
| 7,411,726 | B2 | 8/2008 | Caplan |
| 7,474,859 | B2 | 1/2009 | Mahgerefteh et al. |
| 7,526,210 | B2 | 4/2009 | Liu |
| 7,529,490 | B2 | 5/2009 | Hoshida |
| 7,991,297 | B2 | 8/2011 | Mahgerefteh et al. |
| 8,295,712 | B2 | 10/2012 | Chen et al. |
| 8,411,351 | B2* | 4/2013 | McCallion ............ H04L 27/223 359/325 |
| 9,755,674 | B2 | 9/2017 | Graceffo et al. |
| 9,900,031 | B2 | 2/2018 | Kowalevicz et al. |
| 9,989,989 | B2 | 6/2018 | Kowalevicz |
| 2006/0013591 | A1* | 1/2006 | Rohde .................. H04B 10/675 398/152 |
| 2007/0031150 | A1 | 2/2007 | Fisher et al. |
| 2008/0226300 | A1 | 9/2008 | Mayer et al. |
| 2008/0240736 | A1* | 10/2008 | Ji ........................ H04B 10/677 398/202 |
| 2008/0266573 | A1 | 10/2008 | Choi et al. |
| 2012/0269523 | A1 | 10/2012 | McCallion et al. |
| 2013/0272337 | A1 | 10/2013 | Tan et al. |
| 2014/0314406 | A1* | 10/2014 | Zerbe ..................... H04J 14/02 398/38 |
| 2015/0318982 | A1 | 11/2015 | Kowalevicz et al. |
| 2015/0319061 | A1 | 11/2015 | Kowalevicz |
| 2016/0013870 | A1 | 1/2016 | Sorin et al. |
| 2018/0054259 | A1 | 2/2018 | Kowalevicz et al. |
| 2018/0091227 | A1 | 3/2018 | Dolgin et al. |
| 2018/0091228 | A1 | 3/2018 | Kowalevicz et al. |
| 2018/0091230 | A1 | 3/2018 | Dolgin et al. |
| 2018/0091232 | A1 | 3/2018 | Dolgin et al. |
| 2018/0102853 | A1 | 4/2018 | Dolgin et al. |
| 2018/0145764 | A1 | 5/2018 | Dolgin et al. |
| 2018/0145765 | A1 | 5/2018 | Kowalevicz et al. |
| 2018/0167145 | A1 | 6/2018 | Dolgin et al. |
| 2018/0205463 | A1 | 7/2018 | Karpov et al. |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul. 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

Zhang, L. et al. "Microring-based Modulation and Demodulation of DPSK Signal" Optical Society of America, Optic Express, vol. 15, No. 18, Sep. 3, 2007.

International Search Report and Written Opinion for application No. PCT/US2017/053667 dated Dec. 15, 2017.

Fang et al., "Multi-channel Silicon Photonic Receiver Based On Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

* cited by examiner

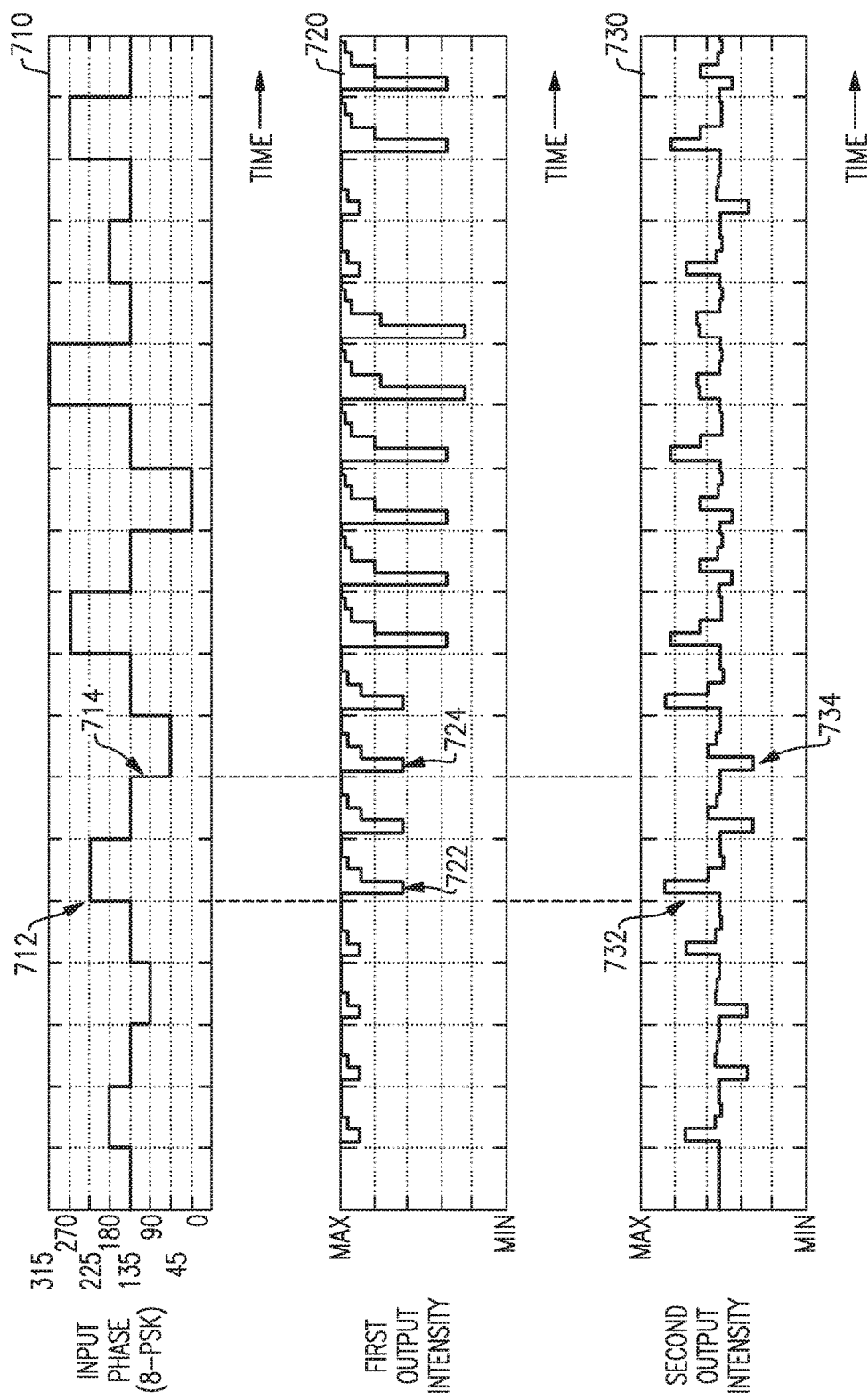

SYSTEMS AND METHODS FOR DEMODULATION OF PSK MODULATED OPTICAL SIGNALS

CROSS-REFERENCE TO RELATED APPLICATIONS

This application claims the benefit under 35 U.S.C. § 119(e) of U.S. Provisional Patent Application No. 62/405,445 titled DEMODULATION OF HIGH ORDER PSK MODULATED OPTICAL BEAM USING MULTIPLE FABRY-PEROT AND MICRO-RING DEMODULATORS and filed on Oct. 7, 2016, which is herein incorporated by reference in its entirety for all purposes.

BACKGROUND

Light waves may be made to carry information by modulating a light source, often a laser source, to change various properties of the light, such as its amplitude, phase, frequency, wavelength, etc. The light waves may be in the visible spectral band, the infrared spectral band, or another region of the electromagnetic spectrum. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, such as the amplitude, phase transitions, and the like, from which the underlying signal and the information may be recovered.

Phase modulation of light signals may convey useful information. Information encoded in phase modulation may include transmitted communication data, or may include other information such as information about the source of the optical signal, interaction of the optical signal with an object, the optical channel through which the optical signal traveled, and/or objects with which it interacted. Compared to typical amplitude modulation receivers, phase modulation receivers can be significantly more complex, requiring precision optics, local oscillators, Fiber Bragg Gratings (FBG), and/or delay line interferometers (DLI), etc.

Conventional high order PSK demodulators use a local reference source and multiple detectors, and operate by measuring intensity of fringes obtained by mixing a received signal with a phase shifted local reference. Thus conventional receivers for high order coherently encoded signals require frequency controlled lasers to serve as local oscillators, and require multiple detectors and significant digital signal processing.

SUMMARY

Aspects and examples described herein provide systems and methods for demodulation of phase encoded information from optical signals, without the necessity for a locally coherent clock source. In particular, certain examples of the system include a receiver having an optical resonator, such as a Fabry-Perot filter/resonator, micro-ring, or other resonator, for converting a phase-encoded optical signal into a plurality of intensity-encoded optical signals. The intensity-encoded optical signals may be easily converted to electrical signals, and processed to interpret amplitude variations to recover or determine the phase-encoded information from the originally received optical signal, thereby reducing cost and complexity of the receiving system. Moreover, such optical resonators may function over a broad range of modulation rates without the need to modify the characteristics of the receiver. Additionally, one or more optical resonators may be employed to pass amplitude and other variations from the received signal, converting them into intensity-encoded output signals and thereby allowing higher order modulation schemes (e.g., phase, amplitude, frequency). Accordingly, the systems and methods disclosed herein may provide the flexibility to accommodate various encoding techniques and various modulation rates (e.g., baud rates) without requiring coherent clock sources.

According to one aspect, an optical signal receiver is provided that includes a first and second optical resonator and a first and second detector. The first optical resonator configured to receive an arriving optical signal and to emit first output optical signal energy, the first optical resonator being further configured to accumulate resonant optical signal energy inside the first optical resonator based at least in part on the received arriving optical signal to cause the first output optical signal energy to approach a first steady-state intensity value, and to cause a first disturbance in the first output optical signal energy responsive to a transition in the arriving optical signal, the first optical resonator being tuned to a carrier wavelength of the arriving optical signal and a resonant wavelength of the resonant optical signal energy corresponding to the carrier wavelength of the arriving optical signal. The second optical resonator configured to receive the arriving optical signal and to emit second output optical signal energy, the second optical resonator being further configured to cause a second disturbance in the second output optical signal energy responsive to the transition in the arriving optical signal, the second optical resonator being detuned from the carrier wavelength of the arriving optical signal. The first detector configured to detect the first disturbance in the first output optical signal energy and to determine a first characteristic of the transition in the arriving optical signal, and the second detector configured to detect the second disturbance in the second output optical signal energy and to determine a second characteristic of the transition in the arriving optical signal.

According to some embodiments, the transition in the arriving optical signal is a phase shift corresponding to a modulation of the arriving optical signal, wherein the first characteristic is a magnitude of the phase shift, and wherein the second characteristic is a direction of the phase shift. In certain examples, the first disturbance is a temporary reduction in an intensity of the first output optical signal energy, and wherein the second disturbance is a variation in intensity of the second output optical signal energy.

In some embodiments, each of the first and second optical resonators is an etalon having two semi-reflective surfaces configured to at least partially trap optical signal energy by reflecting a portion of optical signal energy impinging upon each of the semi-reflective surfaces.

According to certain embodiments, the first optical resonator has at least one dimension having a first value selected to allow the first optical resonator to accumulate the resonant optical signal energy inside the first optical resonator, wherein a corresponding at least one dimension of the second optical resonator has a second value different from the first value. In some embodiments, the first value and the second value differ by less than one wavelength. Further in some embodiments, the first value and the second value differ by a nominal eighth of a wavelength.

In some embodiments, each of the first and second detectors include an optical-electrical converter configured to respectively convert the first and second output optical signal energy into a first and second electrical signal, each of the first and second electrical signals having an amplitude indicative of a respective intensity of the first and second output optical signal energy, and the first and second detector each configured to detect the respective first and second disturbance by processing the respective electrical signal.

According to another aspect, a method of detecting information encoded in an optical signal is provided. The method includes receiving the optical signal at each of a first optical resonator and a second optical resonator, accumulating optical signal energy in each of the first optical resonator and the second optical resonator based on the optical signal, achieving a resonance condition of the accumulated optical signal energy inside the first optical resonator at a carrier wavelength of the optical signal, emitting a first output optical signal from the first optical resonator and emitting a second output optical signal from the second optical resonator, first and second steady-state intensity values of the first and second output optical signals, respectively, being based at least in part on the accumulated optical signal energy, varying a first intensity level of the first output optical signal from the first steady-state intensity level responsive to a modulation transition in the optical signal, varying a second intensity level of the second output optical signal from the second steady-state intensity level responsive to the modulation transition in the optical signal, detecting the first and second output signals, and determining a modulation characteristic of the optical signal based on the variations in the first and second intensity levels.

In some embodiments, determining a modulation characteristic of the optical signal based on the variations in the first and second intensity levels includes determining a magnitude and a direction of a phase shift in the optical signal.

In certain embodiments, varying the first intensity level includes reducing the accumulated optical signal energy in the first optical resonator by destructive interference in response to the modulation characteristic of the optical signal. In some cases, varying the second intensity level includes temporarily increasing the second output optical signal in response to the modulation characteristic being a phase shift in a first direction, and temporarily decreasing the second output optical signal in response to the modulation characteristic being a phase shift in a second direction.

According to some embodiments, accumulating the optical signal energy in each of a first optical resonator and a second optical resonator includes partially reflecting the optical signal energy between semi-reflective surfaces.

Some embodiments also include converting the respective output optical signal from each of the first and second optical resonators into respective electrical signals, amplitudes of the electrical signals being representative of the first and second intensity levels.

According to yet another aspect, an optical receiver is provided that includes a first resonator configured to at least partially accumulate optical signal energy, having an aperture to allow a portion of an optical signal to enter and an output to provide a first output signal, the first resonator configured to cause the first output signal to exhibit variations based at least in part upon a magnitude of a phase shift in the optical signal, a second resonator configured to at least partially accumulate optical signal energy, having an aperture to allow a portion of the optical signal to enter and an output to provide a second output signal, the second resonator configured to cause the second output signal to exhibit variations based at least in part upon a direction of the phase shift in the optical signal, and a receiver configured to receive the first and second output signals and to determine information encoded by the phase shift in the optical signal.

In some embodiments, each of the first and second optical resonators is an etalon having two semi-reflective surfaces configured to at least partially trap optical signal energy by reflecting a portion of optical signal energy impinging upon each of the semi-reflective surfaces.

In some embodiments, each of the first and second optical resonators is a micro-ring having an optical loop configured to at least partially trap optical signal energy.

In certain embodiments, the first optical resonator has at least one dimension having a first value selected to allow the first optical resonator to resonantly accumulate the optical signal energy, wherein a corresponding at least one dimension of the second optical resonator has a second value selected to accumulate the optical signal energy in a non-resonant mode, the second value being different from the first value. In some cases, the first value and the second value differ by less than one wavelength. Further in some cases, the first value and the second value differ by a nominal eighth of a wavelength.

In some embodiments, the receiver includes an optical-electrical converter configured to respectively convert the first and second output signals into a first and second electrical signal, each of the first and second electrical signals having an amplitude indicative of a respective intensity of the first and second output signals, and the receiver configured to detect the variations in the first and second output signals by processing the respective electrical signals.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures:

FIG. 7 is a graph of optical input phase and output intensity from the optical receiver portions of FIGS. 6A-6B.

DETAILED DESCRIPTION

Figure 1:
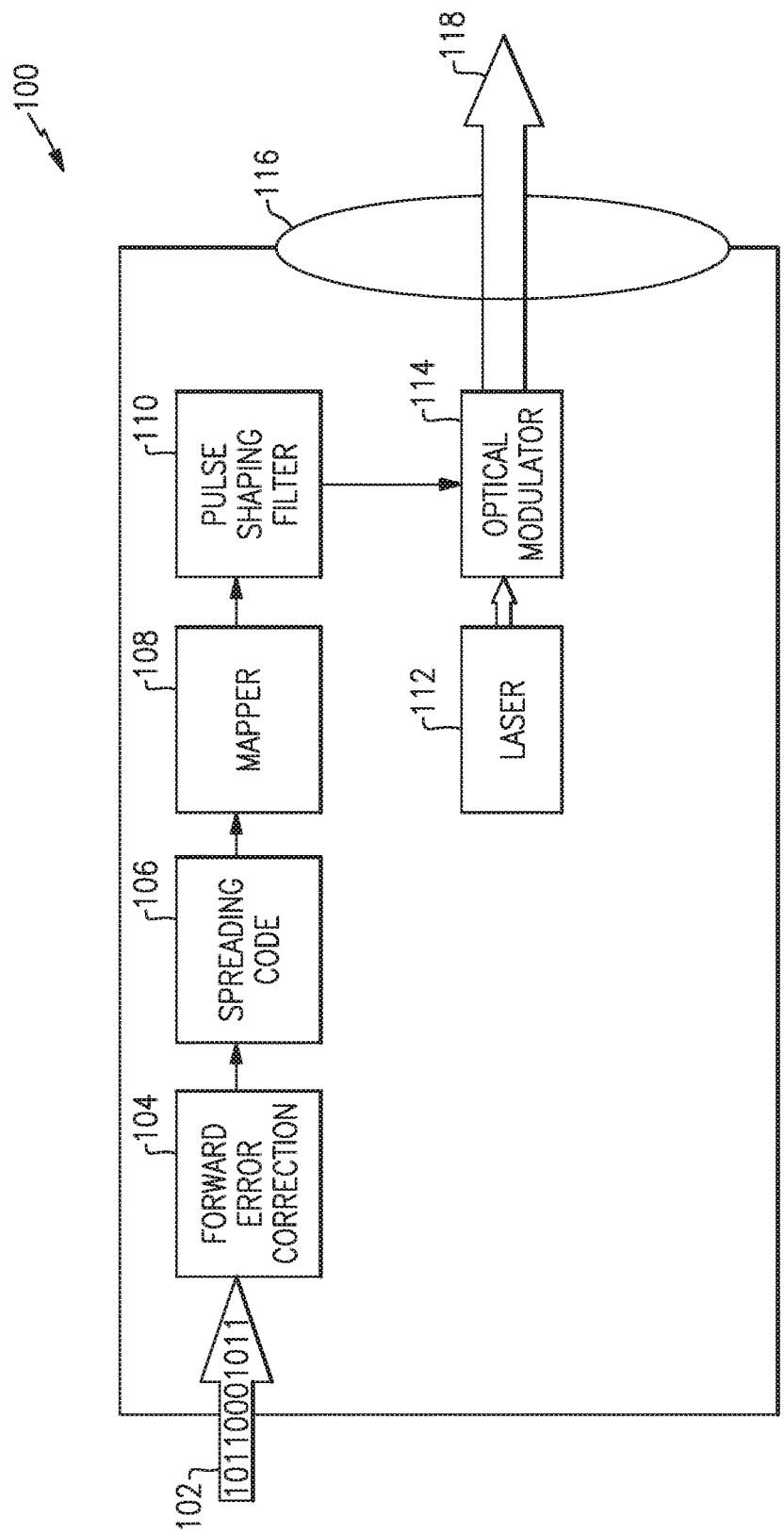
FIG. 1 is a block diagram of a notional optical transmitter for use with various examples described herein.

High bit rate approaches to free space optical communication often use a phase-shift keying modulation format, in part because it allows improvement in signal-to-noise ratio (SNR), typically on the order of 2-3 dB, as compared to direct detection of intensity modulations.

Various aspects and embodiments are directed to improved systems and methods for demodulation of phase-encoded (i.e., phase modulated) optical signals. In certain examples, the system includes a pair of optical resonators, such as Fabry-Perot filter/resonators, which convert a received phase-encoded optical signal into various intensity modulated output signals. Aspects and embodiments are directed to receivers that include such optical resonators as detector and converter elements.

Phase encoded optical signals may come from numerous sources and/or be generated by numerous processes. Detection of the phase encoding may therefore be useful for many purposes. A coherent optical signal, such as a laser beam, may be purposefully modulated by a data communications transmitter for instance, to encode communicated information on the optical signal. Other information, such as timing and/or time stamp information, may be purposefully encoded as a phase modulation. Numerous processes may phase modulate a coherent light source, and from which information about the process may be recovered by appropriate demodulation (e.g., interpreting) of the phase modulated optical signal. For example, various measurement systems may transmit an optical signal and analyze a reflected signal to determine dimensions, movement, defects, etc. Examples of various systems for which demodulation of phase modulated optical signals may be beneficial include target designators, laser guidance systems, laser sight, laser scanners, 3D scanners, homing beacons and/or surveying systems, as well as communication systems. In various of these examples, an optical signal may arrive via a free space signal path (e.g., free space optical, FSO) or a fiber or other waveguide system. Systems and method for demodulation of phase modulated optical signals in accord with aspects and examples disclosed herein may be beneficially applied to any of the above example optical systems, or others, to receive, detect, recover, etc. useful information from an optical signal having phase encoding.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other electromagnetic radiation conventionally processed in the field of optics.

Many optical receivers (e.g., coherent receivers) require a stable clock in order to accurately perform demodulation processes for a received signal, and may also require sophisticated optics such as 90-degree hybrids, phase shifters, and the like, especially when the received signal includes orthogonal channels, e.g., via polarization. In contrast, optical receivers in accord with the aspects and examples disclosed herein do not require a local coherent clock source nor significant optical components to achieve the same receiver capabilities as a conventional optical receiver. The benefits are achieved, at least in part, by an optical front-end that includes an optical resonator capable of detecting modulation transitions, such as phase variations, without a coherent reference source. The optical resonator further transforms the modulation, e.g., phase modulation, into an intensity modulation that allows for direct detection and simplified processing, potentially in the electrical domain.

Figure 2:
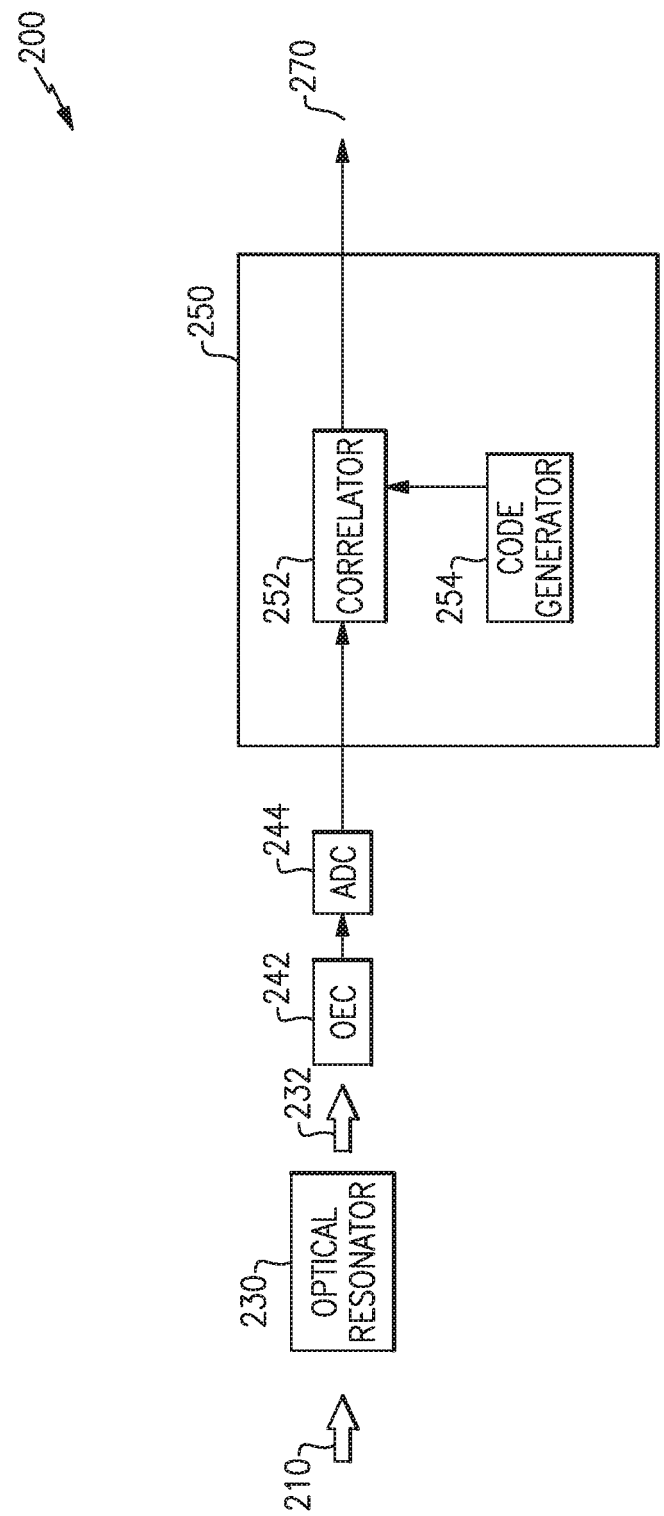
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 shown in FIG. 1 and the optical receiver 200 shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114, and optics 116, and an output 118 to provide an optical signal output.

In the transmitter 100, the FEC module 104 implements forward error correction by adding redundancy to the data with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium.

The transmitter 100 includes a spreading module 106 that applies to the data payload a spreading code useful for identifying and processing signal components in the receiver, and reduces the effects of inter-symbol interference (ISI). For example, the spreading module 106 may include a pseudo-random code generator (PRCG) and may apply direct sequence spread spectrum (DSSS) techniques known in the art, while other examples of transmitters or spreading modules may apply other forms of spreading.

The mapping module 108 maps the data payload to a particular modulation scheme, such as various positions of a particular phase and amplitude constellation, depending upon the types of modulation used by the transmitter, e.g., phase, amplitude, frequency, or any combination of these.

A pulse-shaping filter 110 may receive output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include various optics 116 such as one or more mirrors or lenses to direct the optical signal at the output 118.

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. Additionally, a receiver and a transmitter may be paired together, e.g., to form a transceiver, capable of bidirectional data communication with another transmitter/receiver pair.

The illustrated receiver 200 receives an optical signal 210 and includes an optical resonator 230 and a digital processing subsystem 250 that provides an output 270. The optical resonator 230 may be coupled to the digital processing subsystem 250 by an optical-electrical converter 242 and an analog to digital converter 244, for example.

Examples of optical resonators 230 may include Fabry-Perot etalons, micro-rings, or other types of resonators. The optical resonator 230 is a component capable of sensing transitions, such as phase variations, representative of modulation performed at the transmitter, and transforming the transitions into intensity modulation of an output optical signal, e.g., output optical signal 232. The optical resonator 230 converts the modulation of the arriving optical signal 210 in part by interaction of the arriving optical signal 210 with resonant optical energy built-up in the optical resonator 230.

For example, an etalon is a component having semi-reflective surfaces that may include a transparent material in between, and has one or more characteristic resonant frequencies, each associated with a certain wavelength of light, based upon the spacing (i.e., dimensional length) between the semi-reflective surfaces. The surfaces are semi-reflective and also semi-transmissive, in that they allow some light through, and therefore the arriving optical signal 210 may be allowed into the etalon and may resonate inside the etalon (i.e., between the two semi-reflective surfaces). Additionally, some of the light resonating inside is allowed out of the etalon (through the semi-transmissive surface). Light emerging from the etalon is shown, for example, as the optical signal 232 in FIG. 2.

An optical signal received by an optical resonator 230, an etalon in this example, may establish a steady-state energy-conserving condition in which optical signal energy continuously arrives at the etalon, accumulates or adds to built-up resonating energy existing inside the etalon, and emerges from the etalon at a constant rate. A change in the arriving phase, frequency, or amplitude of the optical signal may disrupt the resonance inside the etalon, and the light intensity emerging from the etalon is also disrupted, until a steady state condition is re-established. Accordingly, a change in phase, frequency, or amplitude of the arriving optical signal 210 causes a change in intensity of the emerging optical signal 232. A large phase transition in the arriving optical signal 210, for example, causes a large (but temporary) intensity change in the emerging optical signal 232. Similar operation occurs in a micro-ring or other optical resonator, and accordingly an optical resonator 230 functions as a demodulator, or a modulation converter, for an optical signal 210. The emerging optical signal 232 may therefore carry the same information content as the arriving optical signal 210, but in intensity modulated form.

The emerging intensity-modulated optical signal 232 may be converted to an electrical signal by an optical-electrical converter, e.g., OEC 242, which may include a photodetector, such as a photodiode, for example. Accordingly, the output of the OEC 242 may be an amplitude modulated signal representative of the intensity-modulated optical signal 232, and may be converted to a digital form by an analog to digital converter, e.g., ADC 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art, and may include, e.g., a correlator 252 and a code generator 254, but the details of any particular implementation may vary.

In various examples, a receiver in accord with aspects and examples disclosed herein may include additional or fewer optics than discussed above, and may omit or add various components relative to those discussed above. For example, focusing optics may be included to receive the emerging optical signal 232 from the optical resonator 230 and to focus the optical signal 232 on the OEC 242. Certain examples may use analog receiver circuitry and therefore may omit one or more of the ADCs 224. Various examples may include a channel estimator as part of the digital processing subsystem 250 to provide phase rotation or other signal adjustments as may be known in the art.

As discussed above, suitable optical resonators include etalons, micro-rings, or other structures. Some detail of at least one example of an etalon is discussed below with respect to FIG. 3. A micro-ring is a resonator formed of one or more waveguides in which at least one is a closed loop such that optical signal energy traversing "around" the loop may be phase aligned with a dimension of the loop at one or more frequencies. Accordingly, optical signal energy traversing the loop may constructively interfere with itself, at certain frequencies, to sustain the optical signal energy within the loop. At other frequencies, optical signal energy traversing the loop will destructively interfere with itself thereby destroying, or rejecting, a build-up of optical signal energy at that frequency. The closed loop is also coupled to some type of input, to allow light to enter the loop, e.g., an aperture, and output to let at least a portion of the optical signal energy within the loop to be emitted out of the loop.

Figure 3:
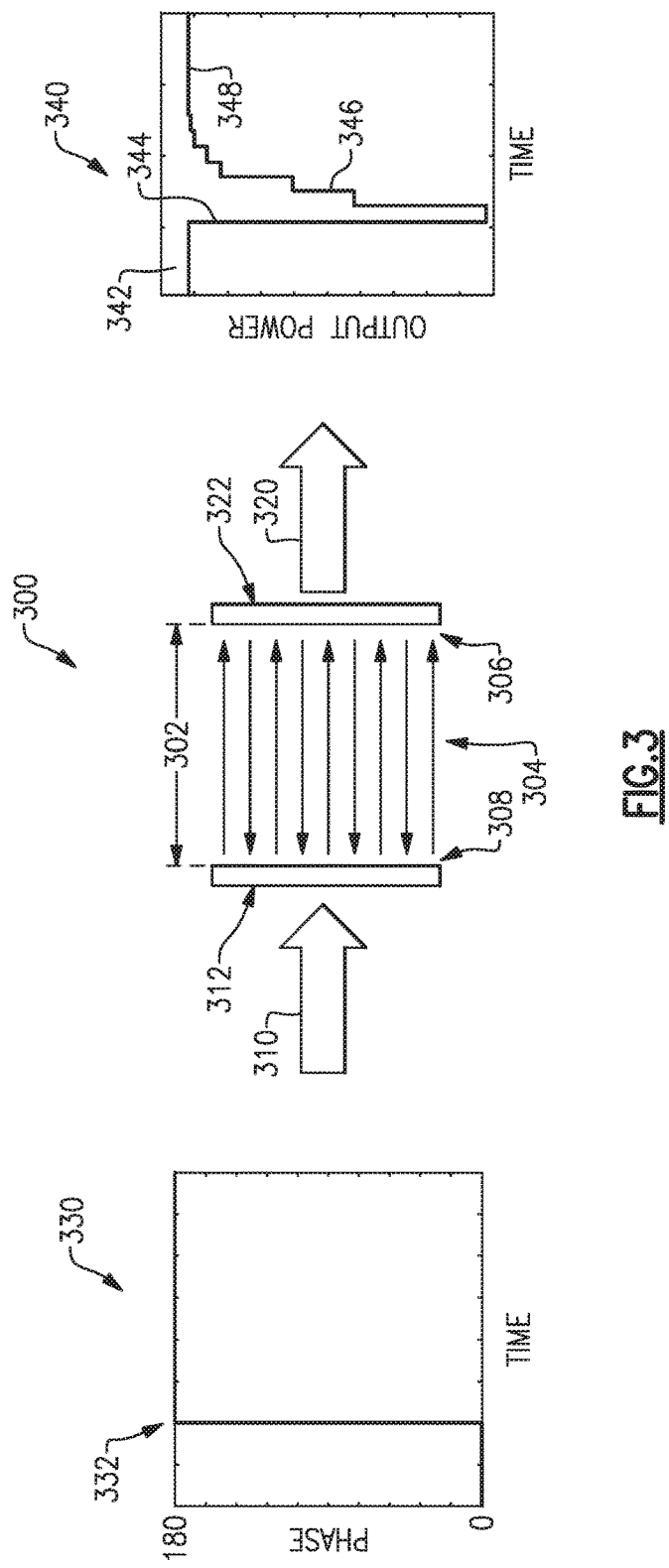
FIG. 3 is a schematic diagram of an example of an optical resonator, including a graph of received signal phase and a graph of output intensity of the optical resonator.

FIG. 3 illustrates an example of an etalon 300 which may be used in various examples of a receiver in accord with aspects and embodiments described herein, for example, as the optical resonator 230 in FIG. 2. In particular, a receiver may use the etalon 300 to convert phase modulations of a received optical communication signal 310 into intensity or amplitude modulations of an output optical signal 320. The intensity or amplitude modulated output optical signal 320 may then be converted to an electrical signal, with corresponding amplitude variations representative of the phase modulation of the received optical signal 310. The etalon 300 causes the received optical signal 310 to resonantly interact with itself, internal to the etalon 300, such that phase changes in the received optical signal 310 disrupt the resonance and cause amplitude (or intensity) variations at the output optical signal 320, which may be coupled directly to a detector.

In particular examples, the etalon 300 is designed to have a resonant frequency aligned with the source, e.g., a transmit laser, of the received optical communication signal 310. In various examples, a dimensional scale, e.g., length 302, of the etalon 300 is selected such that the etalon 300 exhibits optical resonance at the wavelength of the received optical communication signal 310. In certain examples, such dimensional scales are much shorter than the length of a transmitted symbol, which is the distance traveled by the optical signal between transitions that convey information, e.g., between phase changes in a phase modulated signal.

The etalon 300 includes an interior 304 with semi-reflective surfaces 306, 308 that reflect optical signal energy into the interior 304. An input side 312 allows optical signal energy, such as the optical communication signal 310, into the interior 304. The input side 312 thereby forms an aperture through which the arriving optical communication signal 310 is received. An output side 322 forms an optical output, at least in part by action of the semi-reflective surface 306 to allow a portion of trapped optical signal energy from the interior 304 to emerge as an output optical signal, such as the output optical signal 320. Accordingly, the semi-reflective surface 306 is also semi-transmissive, such that optical signal energy arriving (from the interior 304) at the semi-reflective surface 306 is partially reflected back to the interior 304 and partially transmitted through to the output side 322. The etalon 300 may have varying levels of reflectivity of the semi-reflective surfaces 306, 308. In certain examples, the reflectivity may be expressed as a fraction of light amplitude reflected back into the interior 304, or may be expressed as a fraction of light intensity reflected back into the interior 304. In a particular example, an amplitude reflectivity of the first semi-reflective surface 308 may be $r_1 = 0.999$ and an amplitude reflectivity of the second semi-reflective surface 306 may be $r_2 = 0.985$. In other examples the reflectivity of each of the first and second semi-reflective surfaces may be different, and may be any suitable value for a particular implementation. The etalon 300 is one example of a suitable optical resonator in accord with aspects and embodiments described herein.

According to certain examples, an optical resonator, such as the etalon 300, will coherently develop an output signal based on the input signal, and maintain a given level of the output signal until a modulation in the phase of the input signal occurs. When a phase modulation occurs in the input signal, destructive interference causes a phase-dependent change in the amplitude of the output signal. This can be seen in the input phase plot 330 and the output power plot 340 illustrated in FIG. 3. Accordingly, a received phase encoded optical communication signal, such as received optical signal 310, is converted to an amplitude varying signal, such as the output optical signal 320, by the optical resonator, such as the etalon 300. The output optical signal 320 is suitable for direct detection by a sensor, such as the OEC 242 of FIG. 2. Additionally, an optical resonator will function over a broad range of data rates without the need to modify the optical characteristics of the system, such as detector setup, path length adjustments, delay elements, or the like. For example, the ability of the etalon 300 to convert an arriving phase modulated input optical signal 310 into an intensity modulated output optical signal 320 may be independent of the baud rate at which symbols are changed, and therefore the rate at which arriving phase shifts occur, in some examples. Accordingly, an etalon or other optical resonator may accommodate a range of baud rates, up to an effective limit based on effective length.

Use of the term "etalon" throughout this disclosure is not intended to be limiting and as used herein may include any of multiple structures, including plates with reflecting surfaces as well as mirrors with various materials in between, and may also be referred to as cavities, interferometers, and the like. Additionally, such optically resonating structures may be formed as a laminate, layer, film, coating, or the like.

FIG. 3 further illustrates operation of the etalon 300 with reference to the output power plot 340 of optical signal intensity (as output power) emerging from an optical resonator, such as the etalon 300, during a phase transition 332 in the received optical signal 310. At point 342 the etalon 300 is in a steady-state resonance condition wherein a steady intensity of light emerges. At point 344 a phase transition 332 occurs in the arriving optical signal 310, temporarily disrupting the steady-state and causing a change in the emerging light intensity. During successive reflections inside the etalon, labeled at point 346, resonance is being re-established and the emerging light intensity increases until, at point 348, a steady intensity of light emerges when the etalon 300 has returned to a steady-state condition.

Accordingly, variation in emerging light intensity from an optical resonator, such as an etalon or micro-ring, indicates that a transition occurred in an arriving optical signal, such as a phase, frequency, or amplitude variation, and such may be used by appropriate signal processing to determine useful information by analyzing the emerging light intensity. In the example discussed above and illustrated by FIG. 3, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an etalon tuned to the arriving wavelength reacts to a phase variation in the arriving optical signal in accord with the discussion above and as illustrated in FIG. 3. If the arriving optical signal is modulated with binary phase shift keying (BPSK), for example, the output illustrated in FIG. 3 indicates each phase shift, and accordingly the information carried in the phase shift keying may be recovered from the intensity variations at the output optical signal 320. It should be understood by those of skill in the art with the benefit of this disclosure, that such information recovery is achieved without the necessity for a local coherent clock source or the need to support single-mode coupling, such as to a single mode fiber and delay-line interferometer, to demodulate the arriving optical signal.

In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

Figure 4:
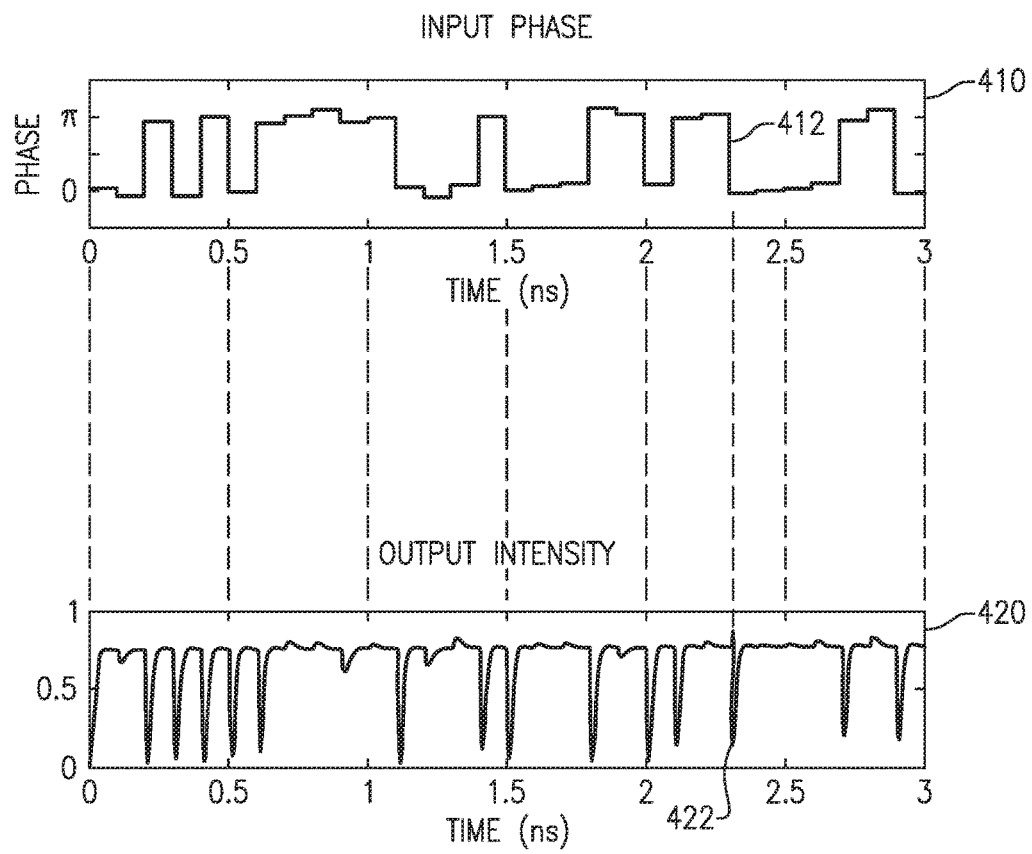
FIG. 4 is a graph of optical input phase and output intensity from an example of the optical resonator of FIG. 3.

FIG. 4 illustrates a plot 410 of varying phase of a received phase modulated optical signal, and a plot 420 of the resulting intensity of an output optical signal, from an optical resonator such as a micro-ring or an etalon, e.g., the etalon 300. The results shown in FIG. 4 are for an etalon having a length of 18 μm and with reflectance of 0.999 at the semi-reflective surface 308 and reflectance of 0.985 at the semi-reflective surface 306. The otherwise continuous input phase (shown in the plot 410) changes at intervals according to the modulated information content, and the plot 410 can be seen as a sequence of binary data, such as high and low bits corresponding to ones and zeros, for example. Among the multiple phase transitions shown in the plot 410, a phase transition 412 is specifically associated with a change 422 in output intensity, shown in the plot 420. Each phase variation in the received optical signal causes a respective change in the output intensity. Accordingly, a receiver can track the changes in output intensity and thereby recover the information content of the received phase modulated optical signal.

Optical signals modulated to carry information have one or more characteristics that may change in either a continuous or discrete fashion, or some combination of the two, and segments of the light over time may be associated with the particular characteristic(s) that indicates the information being conveyed. For example, a phase modulated digital optical transmitter may emit coherent light of a certain phase relationship (relative to a reference time and/or phase) to indicate a particular value. The light emitted to indicate the value may be considered a segment of light, or a length of light, whose phase indicates the value. At later times the transmitter alters the light characteristic to emit a second segment of light to indicate a second value, then again later to emit a third segment of light, then a fourth, and so on. The rate at which the transmitter discretely alters the characteristic, such as phase in this example, is a modulation rate of the transmitter, also known as a symbol rate or baud rate.

Each segment of light has a physical length associated with it based upon the duration of time between transitions, and the speed of light in the propagation medium. For example, a modulation rate of $10^8$ baud (100 million symbols per second) emits light segments of 10 nanosecond duration with length of approximately 3 meters (in air or vacuum). Higher modulation rates generate shorter light segments and lower modulation rates generate longer light segments. A particular phase relationship of a single light segment may represent more than a single binary digit (bit) of information, e.g., because the phase (and/or amplitude), for example, may be selected from among multiple phases (and/or amplitudes), such that the information-carrying characteristic is not a binary selection. Accordingly, baud rate, symbol rate, or modulation rate is not necessarily equal to a transmission bit rate for a transmission system. Instead, the bit rate is generally the modulation rate times the number of bits per symbol (e.g., bits per light segment).

Some optical transmission systems may alter different or additional light characteristics, such as amplitude, frequency, wavelength, for instance, and may vary the modulation rate over time, e.g., based on channel characteristics, noise, error rate, and the like. Additionally, some optical systems may cause light to be modulated in an analog fashion, such as by a continuous variation in amplitude or phase of the light signal, and therefore not have a modulation rate per se. For the purposes of this disclosure, aspects and embodiments are generally described in the context of a discrete transmission system including a phase modulation, though it is to be understood that aspects and embodiments disclosed herein may be equally useful as receivers for systems that generate light signals that convey information differently than that described.

The response of a resonator to a 180-degree phase shift is as discussed above with reference to FIGS. 3 and 4. Intentional information-carrying phase shifts when using binary phase shift keying involve only 180-degree phase shifts, which may be directly detected and demodulated with use of on optical resonator as described above. Higher order phase shift keying, such as quadrature phase shift keying (QPSK), 8PSK, or more (e.g., M-ary PSK) may also be accommodated by systems and methods described herein, with a combination of optical resonators.

Figure 5:
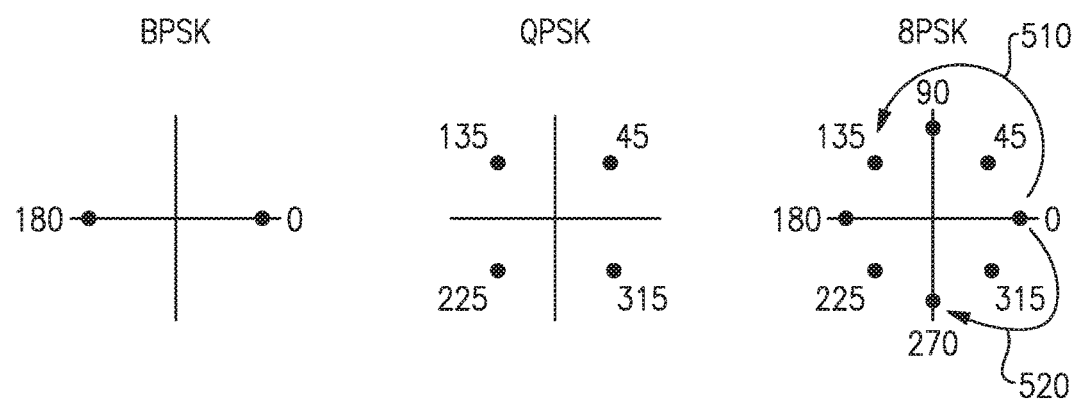
FIG. 5 is a schematic diagram of phase constellations for various phase shift keying schemes.

FIG. 5 illustrates example signal constellations for various phase shift keying, including BPSK, QPSK, and 8PSK, though higher orders beyond eight, as well as higher order quadrature amplitude modulation (QAM) may also be accommodated by the systems and methods described herein. For the modulation schemes depicted in FIG. 5, an intentional phase shift in the arriving optical signal may be from any phase shown in the respective constellation to any other phase shown in the respective constellation. For example, the phase transition 510 is a phase shift that advances 135 degrees, from the 0-degree position to the 135-degree position on the 8PSK constellation. The phase transition 520 is a phase shift that retreats 90 degrees, from the 0-degree position to the 270-degree position on the 8PSK constellation.

With continued reference to FIG. 5, QPSK phase transitions of the arriving optical signal are between four different phases of 0, 90, 180, and 270 degrees, for example. The response of an optical resonator to a 90 degree phase shift is a lesser variation in output intensity than to the 180 degree phase shift as discussed above, with reference to FIG. 3. This is because the more significant change of 180 degrees interferes more strongly with the resonance in the resonator, e.g., the etalon 300, and takes longer to re-establish steady-state, than does a phase shift of only 90 degrees. Accordingly, a 180 degree phase shift causes a disturbance in output signal greater than for a 90 degree phase shift. The optical resonator may, however, produce the same disturbance in output for a 90 degree phase advance as for a 90 degree phase retreat, making a phase advance and a phase retreat difficult to distinguish when they are the same magnitude of phase shift. Accordingly, in some examples a secondary optical resonator is added to distinguish a positive phase shift from a negative phase shift, e.g., an advance in phase from a retreat in phase.

Figure 6A:
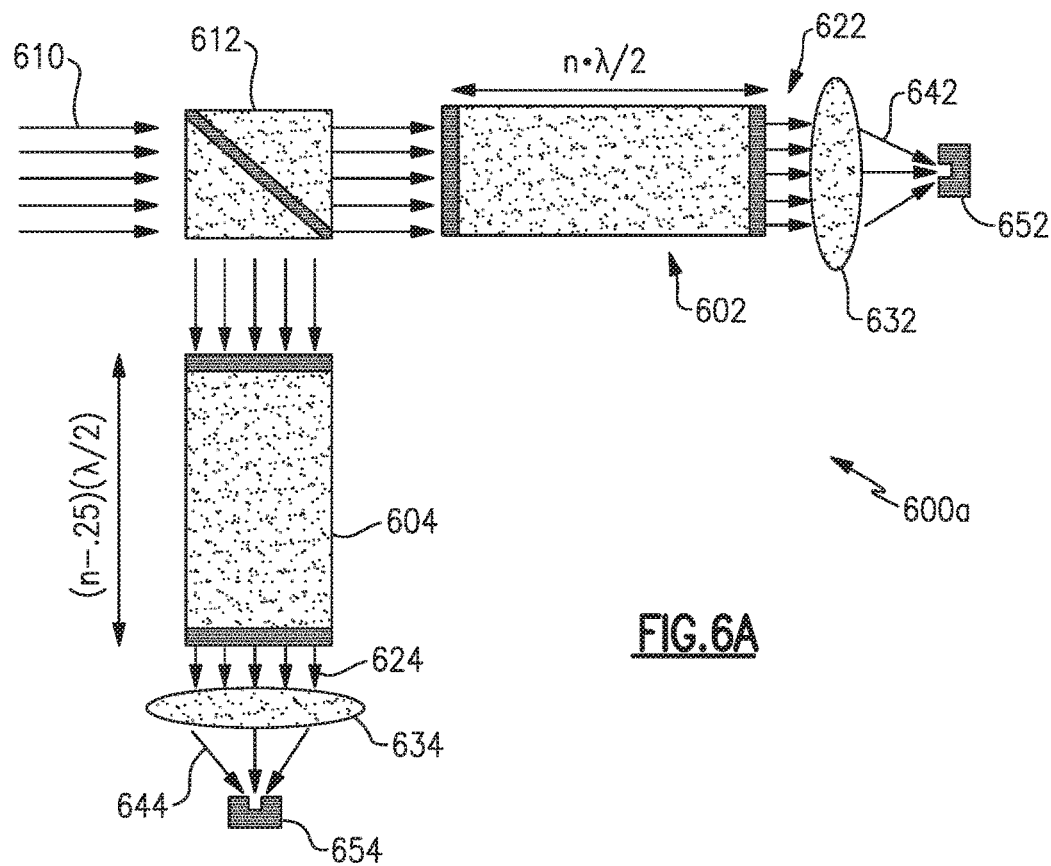
FIGS. 6A-6B are schematic diagrams of examples of optical receiver portions utilizing an optical resonator.
Figure 6B:
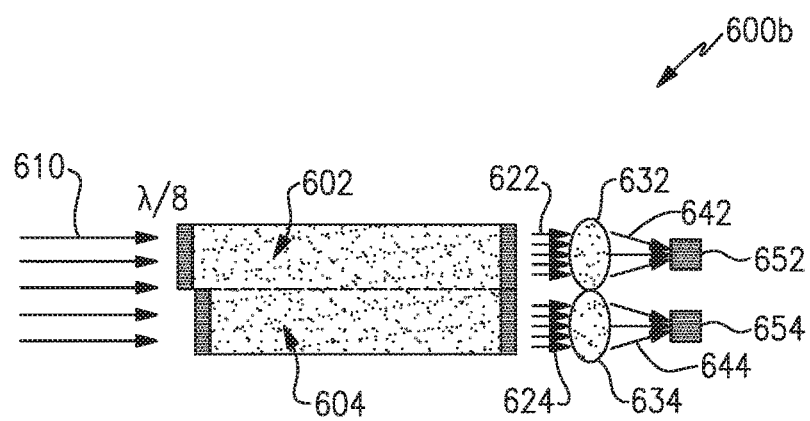

FIG. 6A illustrates an optical system 600*a* and FIG. 6B illustrates an optical system 600*b*, each of which may operate as combination optical resonators to allow detection and demodulation of phase shifts having various magnitude and direction (phase advance or phase retreat). Each of the optical systems 600 shown includes a tuned resonator 602 and a detuned resonator 604, that are etalons as shown but may be other forms of optical resonators in various examples. In the case of the optical system 600*a*, an arriving optical signal 610 is split by a splitter 612 such that a portion of the arriving optical signal 610 arrives at the tuned resonator 602 and another portion arrives at the detuned resonator 604. In the optical system 600*b*, various portions of an arriving optical signal 610 arrive at each of the tuned resonator 602 and the detuned resonator 604 without a splitter. The tuned resonator 602 operates as previously discussed with respect to FIGS. 3-4, while the detuned resonator 604 operates on the arriving optical signal 610 in a somewhat different manner, each of which will be discussed in more detail.

The tuned resonator 602 receives a portion of the arriving optical signal and, as discussed, converts phase transitions into intensity modulations of an output optical signal 622. The output optical signal 622 may be focused to varying extent by various optics 632 (e.g., lens), in some examples, to provide a focused output optical signal 642. In other examples the output optical signal 622 may not be focused. Either of the output optical signal 622 or the focused output optical signal 642 may be provided to an optical-electrical converter 652, which may be a photodetector, such as a photodiode, as discussed previously, to convert the intensity modulated output optical signal energy into an electrical signal, which may further be converted to a digital format, also as discussed previously. Intensity variations in the output optical signal 622 and/or amplitude variations in an electrical signal output by the converter 652 may accordingly indicate phase shifts in the arriving optical signal 610. As previously discussed, however, a phase advance of a certain magnitude may be difficult to distinguish from a phase retreat of the same magnitude, because each of such phase shifts may produce a similar intensity or amplitude variation in the respective output signal (optical or electrical).

The detuned resonator 604, however, interacts with a portion of the arriving optical signal 610 in a manner that may allow detection of whether a certain phase shift is an advance in phase or a retreat in phase. While the tuned resonator 602 is tuned to the intended wavelength (e.g., an optical length of an etalon being an integer multiple of half-wavelengths, for example), the detuned resonator 604 is somewhat off tune to the intended wavelength. In the examples of FIGS. 6A-6B, the detuned resonator 604 has a shorter resonant dimension (length) by an eighth (⅛) of a wavelength, but in other examples the detuned resonator 604 may differ in a resonant dimension by a different amount, and/or may be longer than the tuned resonator 602 by various amounts. Accordingly, the arriving optical signal 610 may not achieve resonance in the detuned resonator 604, but nonetheless approaches a steady-state and provides an output optical signal 624. As above, the output optical signal 624 may be optionally focused by various optics 634 into a focused output optical signal 644, and may be provided to an optical-electrical converter 654, which may be a photodetector, such as a photodiode, as discussed previously, whose output may be further converted to a digital format, also as discussed previously.

While the arriving optical signal 610 may not achieve resonance in the detuned resonator 604, a steady-state condition (or a condition of approaching steady-state) is temporarily interrupted by any phase shift occurring in the arriving optical signal 610, and such interruption causes intensity variation in the output optical signal 624 such as may be detected and interpreted by suitable components. With reference to FIG. 7, intensity variations in the output optical signal 624 from the detuned resonator 604 may indicate the direction of a phase shift, whether advancing or retreating.

FIG. 7 illustrates varying phase 710 of a received phase modulated optical signal, a resulting output optical intensity 720 from a tuned optical resonator, such as a micro-ring or an etalon, for example the tuned resonator 602, and a resulting output optical intensity 730 from a detuned optical resonator, such as a micro-ring or an etalon, for example the detuned resonator 604.

A particular phase shift 712 is shown and represents an advance of 90 degrees phase in the arriving optical signal. The tuned resonator provides an output intensity variation 722 in response to the phase shift 712, as previously described with reference to FIGS. 3 and 4. The detuned resonator also provides an output intensity variation 732 in response to the phase shift 712. The variation 732 is an increase in output intensity from the detuned resonator. In this example, the detuned resonator may be optically shorter than the tuned resonator, such that an advance of phase (such as that of phase shift 712) in the arriving optical signal may constructively interfere with optical signal energy in the resonator, e.g., at the point of entry, and therefore temporarily increase the energy output. For example, because the resonator is detuned in a certain direction (e.g., shorter in this example) the optical signal energy in the resonator might be considered "ahead" in phase, relative to that of a tuned resonator, at the point of entry, and therefore a phase advance in the arriving optical signal may constructively interfere, causing an accordant shift or approach toward resonance in the (e.g., shorter) detuned resonator.

The variation 732 is to be contrasted with a later variation 734 caused by a later phase shift 714 in the arriving optical signal. In this case, the phase shift 714 represents a phase retreat of 90 degrees, not an advance. Accordingly, the phase shift 714 includes a similar magnitude of phase shift but in the opposite direction, a retreat instead of an advance in phase. An output intensity variation 724 from the tuned resonator is substantially the same as the variation 722, because the tuned resonator responds to the 90 degree phase shift approximately the same way regardless of whether the phase shift is an advance or a retreat. The variation 734, however, is a reduction in output intensity from the detuned resonator, unlike the variation 732 which is an increase in output intensity. As above, the detuned resonator is shorter than the tuned resonator (in this example), such that a retreat of phase (such as that of phase shift 714) in the arriving optical signal may destructively interfere with optical signal energy, at the point of entry to the resonator, and therefore temporarily decrease the energy output.

Accordingly, as can be seen in FIG. 7, each advance in arriving phase 710 causes a temporary increase in the output intensity 730 from the (shorter) detuned resonator, and each retreat in arriving phase 710 causes a temporary decrease in the output intensity 730 from the (shorter) detuned resonator. In other examples, a detuned resonator may have an optical dimension greater than the tuned resonator such that an advance in phase causes a temporary decrease in output intensity and a retreat in phase causes a temporary increase in output intensity.

Accordingly, appropriate processing of the intensity modulated output optical signals from the tuned resonator and the detuned resonator, in electrical form in some examples, and optionally in digital form, may interpret the intensity variations to determine the magnitude and direction of phase shifts in the arriving optical signal, and therefore determine the information content represented by phase modulation of the arriving optical signal.

Advantages of the aspects and embodiments described herein are numerous. For example, optical components may be lower cost or less complex than those required for conventional systems, such as allowing for coated or uncoated glass rather than crystal or expensive coatings. Use of optical resonators, such as etalons, for converting phase modulation into intensity modulation, may be advantageously designed to incorporate filtering (e.g., rejection of unwanted signals, via resonant dimensions, for example) which may provide improved signal-to-noise characteristics. Aspects and embodiments in accord with those described herein may satisfactorily operate in extreme aberration or turbulence in which adaptive optics would fail. Further, aspects and embodiments in accord with those described herein may achieve free-space optical communications with low size, weight, power, and cost requirements, improving support for platforms such as unmanned aerial vehicles and microsatellites.

It should be appreciated that the various disruptions to output intensity caused by modulation of an arriving light signal may vary with resonant physical dimensions of an optical resonator, such as the dimensional length of an etalon or micro-ring, and how accurately it is manufactured, e.g., how well tuned the etalon is to one or more wavelengths. Output intensity from an etalon with a smaller dimensional length is more quickly disrupted by a transition in the input signal, and more quickly re-establishes steady state after such a transition, relative to an etalon with a larger resonant dimension. Additionally, an etalon manufactured to a more accurate tolerance, i.e., more accurately tuned to the particular wavelength (or set of wavelengths), provides a higher resonant output signal intensity at steady state and exhibits greater sensitivity to transitions in input signals, relative to an etalon manufactured to a less accurate tolerance.

Various embodiments may have various etalon dimensions and tolerances based upon particular design criteria and to accommodate varying operational characteristics. In some examples, various etalon dimensions and tolerances may be selected to trade off, or balance, how strongly and/or how quickly the etalon responds to transitions in an arriving optical signal, such as phase transitions associated with phase modulation, and how quickly the etalon approaches a return to steady-state after a transition. Additionally, various etalon dimensions and tolerances may be selected to optimize a receiver, such as the receiver 200, for a particular data rate and/or a particular wavelength.

Various dimensions of an optical resonator in accord with aspects and examples disclosed herein may be significantly smaller than a dimension associated with a baud rate or symbol length of a phase encoded optical signal. In some examples, a resonant dimension (e.g., etalon length, cavity round-trip length, loop length of a micro-ring, etc.) may provide an effective optical length less than half the distance associated with a baud rate or symbol length. For example, a baud rate may be a rate at which modulation variations occur, and a symbol length may be the distance an optical signal travels between modulation variations.

In the case of an optical resonator, the distance the optical signal travels may be based upon the material, or optical media, from which the optical resonator is constructed. For an optical resonator such as an etalon or micro-ring capable of storing optical signal energy (and providing resonance through constructive and destructive interference), optical signal energy remains in the resonator for a greater amount of time, such that an effective optical length is greater than the resonator's physical length, i.e., optical signal energy spends more time in the resonator than if the resonator allowed the optical signal to pass through without resonantly accumulating. Accordingly, a time until the next modulation variation (i.e., inverse of the baud rate) may be enough time for an arriving optical signal to traverse the resonant dimension of the optical resonator numerous times. In certain examples, the resonant dimension (etalon length) may provide an effective optical length one third or less of the symbol length. In some examples, the physical dimension of the etalon length may be on the order of one tenth of the symbol length or less, (e.g., depending upon the reflectivity of the etalon surfaces, for example) to provide an effective optical length of one third of the symbol length. Accordingly, in some examples, a symbol length may be as short as 10 times the physical dimension of the etalon, or less. Additionally, the symbol length may be as long as 5,000 times the physical dimension of the etalon, or more, in accord with aspects and examples being capable of accommodating a wide variety of modulation rates, as previously discussed.

Additional benefits associated with the use of an optical resonator, such as an etalon or micro-ring, as a front end component combined with a processing subsystem, for the reception of modulated optical signals, include flexible operation, capable of receiving signals from free space or via a fiber coupling or other optical waveguides and/or components. An optical resonator may also provide noise reduction due to rejection of optical signal energy outside the intended wavelengths, e.g., due to the resonate nature. Additionally, an optical resonator may be provided with coatings or other features to further reject undesired optical wavelengths, including alternate resonant wavelengths that are not intended to be part of the received signal. For example, a particular length (or width, depending upon perspective) of an optical component may resonate at multiple wavelengths but coatings and/or other design features may act to limit the build-up of optical signal energy at the undesired wavelengths, such as a coating that provides reduced reflectivity at alternate wavelengths, or filters integrated with or placed before the aperture of the optical resonator, or others.

Additional modulation formats may also be accommodated by particular design characteristics of an optical resonator. The resonant nature may respond to amplitude, frequency, pulse width, or other modulations in addition to purely phase transitions. For example, a pulse width modulated signal causes the signal energy trapped in the resonator to build up or approach a steady-state value, and the longer the pulse width the closer the resonator will come to, or the longer it will remain in, a steady-state signal energy condition. When the pulse ceases, the optical resonator's output will change similar in manner to a phase transition. Differing amplitude of an arriving optical signal causes a resonator to approach different steady-state output intensity values, thus amplitude variations may be detected by suitable processing of the output optical signal(s). Frequency variations may shift one or more resonators toward or away from resonance, thereby also affecting the output intensity, and thus may be detectable and interpretable by suitable processing in some examples. Accordingly, phase, amplitude, frequency, and pulse width modulations of an arriving optical signal may be detected by processing the optical intensity output from one or more optical resonators in accord with systems and methods described herein.

In certain examples, an arriving optical signal may include amplitude and phase modulation, such as quadrature amplitude modulation (QAM), for example, of varying symbol constellation densities. The optical systems 600 of FIGS. 6A and 6B are capable of passing amplitude variations from the arriving optical signal in the form of steady-state or "settling" output intensities, while also passing phase variations from the arriving optical signal as intensity modulations of the output optical signal in the manner(s) described above. For example, if the amplitude of the arriving optical signal shifts to a higher or lower value, the output intensities from the resonators 602, 604 will approach a new higher or lower steady-state output value, respectively. In some examples, the resonators need not reach the new steady-state output intensity values, as suitable processing may determine the new steady-state output intensity via, e.g., analysis of a signal trajectory or slope. Meanwhile, the intensity variations described previously in response to phase shifts in the arriving optical signal may still be interpreted by suitable processing as previously described, in parallel with the analysis of steady-state values for determining amplitude modulations in the arriving optical signal. Accordingly, certain examples of the systems and methods described herein are capable of detecting and demodulating QAM optical signals of M-ary order.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

As discussed above with reference to FIGS. 1 and 2, in various examples components of the transmitter 100 and/or receiver 200 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 8:
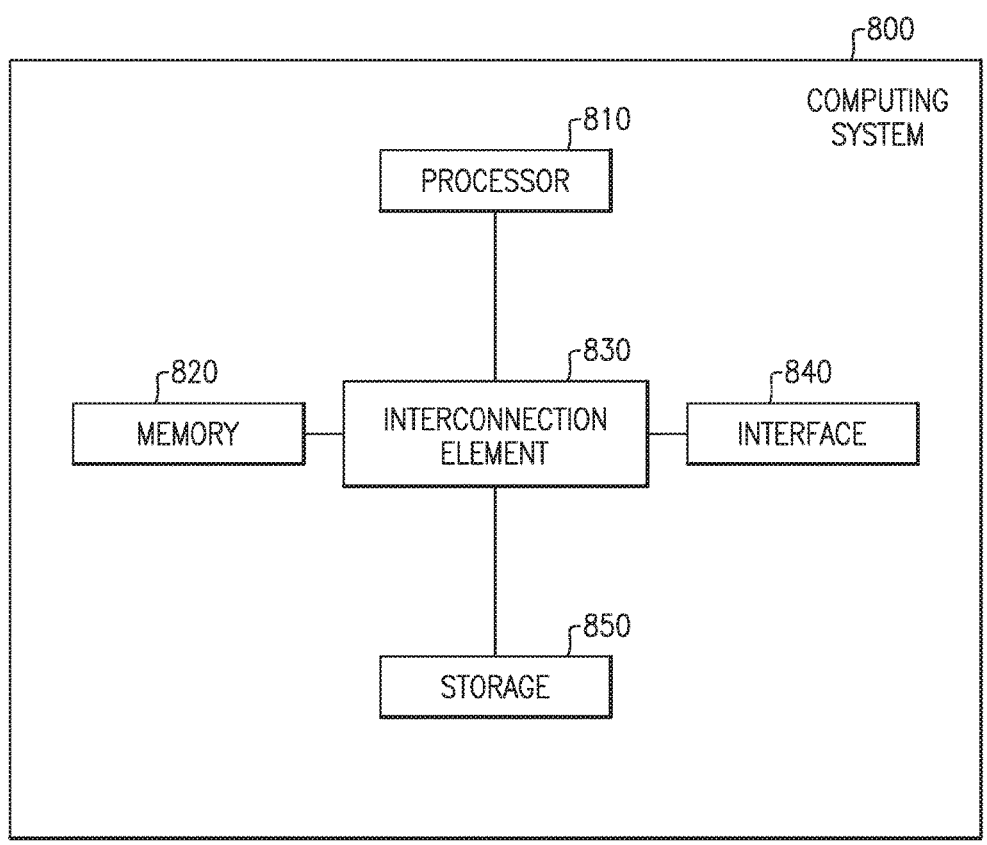
FIG. 8 is a functional block diagram of an example of a computing system that may be configured to implement various examples of the processes described herein.

FIG. 8 illustrates one example of a computing system 800 that may implement software routines corresponding to a control circuit or module, the FEC module 104, the spreading module 106, the mapping module 108, as illustrated in FIG. 1, and/or other components. The computing system 800 may further implement software routines corresponding to the correlator 252 and/or the code generator 254 associated with the digital processing subsystem 250 of FIG. 2 and/or other components of a receiver 200. The computing system 800 may include a processor 810, data storage 850, a memory 820, and one or more interfaces 840, such as a system interface and/or a user interface. While not explicitly illustrated in FIG. 8, in certain examples the computing system 800 may be coupled to a power source. The power source may deliver power to one or more components of the computing system 800, as well as other components of the optical transmitter 100 or optical receiver 200.

In FIG. 8, the processor 810 is coupled to the data storage 850, memory 820, and the various interfaces 840. The memory 820 stores programs (e.g., sequences of instructions coded to be executable by the processor 810) and data during operation of the computing system 800. Thus, the memory 820 may be a relatively high performance, volatile, random access memory such as a dynamic random access memory ("DRAM") or static memory ("SRAM"). However, the memory 820 may include any device for storing data, such as a disk drive or other nonvolatile storage device. Various examples may organize the memory 820 into particularized and, in some cases, unique structures to perform the functions disclosed herein. These data structures may be sized and organized to store values for particular data and types of data.

The data storage 850 includes a computer readable and writeable data storage medium configured to store non-transitory instructions and other data, and can include non-volatile storage media, such as optical or magnetic disk, ROM or flash memory. The instructions may include executable programs or other code that can be executed by the at least one processor 810 to perform any of the functions described herein.

In various examples, the computing system 800 includes several interface components 840, such as a system interface and/or a user interface. Each of the interface components 840 is configured to exchange, e.g., send or receive, data with other components of the computing system 800 (and/or associated transmitter or receiver), or other devices in communication with the computing system 800. According to various examples, the interface components 840 may include hardware components, software components, or a combination of hardware and software components.

In certain examples, components of the system interface couples the processor 810 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 800 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 800. Data received at the various interfaces may be provided to the processor 810, as illustrated in FIG. 8. Communication coupling (e.g., shown interconnection mechanism 830) between the processor 810, memory 820, data storage 850, and interface(s) 840 may be implemented as one or more physical busses in conformance with standard, proprietary, or specialized computing bus technologies.

The processor 810 performs a series of instructions that result in manipulated data that is stored in and retrieved from the data storage 850, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 810 may be any type of processor, multi-processor or controller, whether commercially available or specially manufactured. For instance, the processor may include a commercially available processor, such as a processor manufactured by INTEL, AMD, MOTOROLA, or FREESCALE. In some examples, the processor 810 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
a first optical resonator configured to receive an arriving optical signal and to emit first output optical signal energy, the first optical resonator including an optical length less than half of a distance associated with a symbol length of the arriving optical signal, such that the first optical resonator is configured to accumulate resonant optical signal energy inside the first optical resonator based at least in part on the received arriving optical signal to cause the first output optical signal energy to approach a first steady-state intensity value, and to cause a first disturbance in the first output optical signal energy responsive to a transition in the arriving optical signal, the first optical resonator being tuned to a carrier wavelength of the arriving optical signal and a resonant wavelength of the resonant optical signal energy corresponding to the carrier wavelength of the arriving optical signal;
a second optical resonator configured to receive the arriving optical signal and to emit second output optical signal energy, the second optical resonator being further configured to cause a second disturbance in the second output optical signal energy responsive to the transition in the arriving optical signal, the second optical resonator being detuned from the carrier wavelength of the arriving optical signal;
a first detector configured to detect the first disturbance in the first output optical signal energy and to determine a first characteristic of the transition in the arriving optical signal; and
a second detector configured to detect the second disturbance in the second output optical signal energy and to determine a second characteristic of the transition in the arriving optical signal.

2. The optical signal receiver of claim 1 wherein the transition in the arriving optical signal is a phase shift corresponding to a modulation of the arriving optical signal, wherein the first characteristic is a magnitude of the phase shift, and wherein the second characteristic is a direction of the phase shift.

3. The optical signal receiver of claim 2 wherein the first disturbance is a temporary reduction in an intensity of the first output optical signal energy, and wherein the second disturbance is a variation in intensity of the second output optical signal energy.

4. The optical signal receiver of claim 1 wherein each of the first and second optical resonators is an etalon having two semi-reflective surfaces configured to at least partially trap optical signal energy by reflecting a portion of optical signal energy impinging upon each of the semi-reflective surfaces.

5. The optical signal receiver of claim 1 wherein the first optical resonator has at least one dimension having a first value selected to allow the first optical resonator to accumulate the resonant optical signal energy inside the first optical resonator, wherein a corresponding at least one dimension of the second optical resonator has a second value different from the first value.

6. The optical signal receiver of claim 5 wherein the first value and the second value differ by less than one wavelength.

7. The optical signal receiver of claim 1 wherein each of the first and second detectors include an optical-electrical converter configured to respectively convert the first and second output optical signal energy into a first and second electrical signal, each of the first and second electrical signals having an amplitude indicative of a respective intensity of the first and second output optical signal energy, and the first and second detector each configured to detect the respective first and second disturbance by processing the respective electrical signal.

8. A method of detecting information encoded in an optical signal, the method comprising:
receiving the optical signal at each of a first optical resonator and a second optical resonator, each of the first optical resonator and the second optical resonator including an optical length less than half of a distance associated with a symbol length of the optical signal;

accumulating optical signal energy in each of the first optical resonator and the second optical resonator based on the optical signal;

achieving a resonance condition of the accumulated optical signal energy inside the first optical resonator at a carrier wavelength of the optical signal;

emitting a first output optical signal from the first optical resonator and emitting a second output optical signal from the second optical resonator, first and second steady-state intensity values of the first and second output optical signals, respectively, being based at least in part on the accumulated optical signal energy;

varying a first intensity level of the first output optical signal from the first steady-state intensity level responsive to a modulation transition in the optical signal;

varying a second intensity level of the second output optical signal from the second steady-state intensity level responsive to the modulation transition in the optical signal;

detecting the first and second output signals; and determining a modulation characteristic of the optical signal based on the variations in the first and second intensity levels.

9. The method of claim 8 wherein determining a modulation characteristic of the optical signal based on the variations in the first and second intensity levels includes determining a magnitude and a direction of a phase shift in the optical signal.

10. The method of claim 8 wherein varying the first intensity level includes reducing the accumulated optical signal energy in the first optical resonator by destructive interference in response to the modulation characteristic of the optical signal.

11. The method of claim 10 wherein varying the second intensity level includes temporarily increasing the second output optical signal in response to the modulation characteristic being a phase shift in a first direction, and temporarily decreasing the second output optical signal in response to the modulation characteristic being a phase shift in a second direction.

12. The method of claim 8 wherein accumulating the optical signal energy in each of a first optical resonator and a second optical resonator includes partially reflecting the optical signal energy between semi-reflective surfaces.

13. The method of claim 8 further comprising converting the respective output optical signal from each of the first and second optical resonators into respective electrical signals, amplitudes of the electrical signals being representative of the first and second intensity levels.

14. An optical receiver comprising:

a first resonator configured to at least partially accumulate optical signal energy, having an aperture to allow a portion of an optical signal to enter, an optical length less than half of a distance associated with a symbol length of the optical signal, and an output to provide a first output signal, the first resonator configured to cause the first output signal to exhibit variations based at least in part upon a magnitude of a phase shift in the optical signal;

a second resonator configured to at least partially accumulate optical signal energy, having an aperture to allow a portion of the optical signal to enter and an output to provide a second output signal, the second resonator configured to cause the second output signal to exhibit variations based at least in part upon a direction of the phase shift in the optical signal; and a receiver configured to receive the first and second output signals and to determine information encoded by the phase shift in the optical signal.

15. The optical receiver of claim 14 wherein each of the first and second optical resonators is an etalon having two semi-reflective surfaces configured to at least partially trap optical signal energy by reflecting a portion of optical signal energy impinging upon each of the semi-reflective surfaces.

16. The optical receiver of claim 14 wherein each of the first and second optical resonators is a micro-ring having an optical loop configured to at least partially trap optical signal energy.

17. The optical receiver of claim 14 wherein the first optical resonator has at least one dimension having a first value selected to allow the first optical resonator to resonantly accumulate the optical signal energy, wherein a corresponding at least one dimension of the second optical resonator has a second value selected to accumulate the optical signal energy in a non-resonant mode, the second value being different from the first value.

18. The optical receiver of claim 17 wherein the first value and the second value differ by less than one wavelength.

19. The optical receiver of claim 18 wherein the first value and the second value differ by a nominal eighth of a wavelength.

20. The optical receiver of claim 14 wherein the receiver includes an optical-electrical converter configured to respectively convert the first and second output signals into a first and second electrical signal, each of the first and second electrical signals having an amplitude indicative of a respective intensity of the first and second output signals, and the receiver configured to detect the variations in the first and second output signals by processing the respective electrical signals.

* * * * *